United States Patent
Orii

(10) Patent No.: US 7,490,150 B2
(45) Date of Patent: Feb. 10, 2009

(54) STORAGE SYSTEM, ADAPTER APPARATUS, INFORMATION PROCESSING APPARATUS AND METHOD FOR CONTROLLING THE INFORMATION PROCESSING APPARATUS

(75) Inventor: Masaru Orii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 542 days.

(21) Appl. No.: 11/229,566

(22) Filed: Sep. 20, 2005

(65) Prior Publication Data
US 2007/0011488 A1    Jan. 11, 2007

(30) Foreign Application Priority Data
Jul. 7, 2005    (JP)    ............................. 2005-199341

(51) Int. Cl.
*G06F 15/173* (2006.01)
*G06F 11/00* (2006.01)
*G06F 12/00* (2006.01)

(52) U.S. Cl. ............................. 709/224; 711/114; 714/5

(58) Field of Classification Search ................. 709/224, 709/226, 223
See application file for complete search history.

(56) References Cited

U.S. PATENT DOCUMENTS

| | | | |
|---|---|---|---|
| 6,859,896 B2 * | 2/2005 | Apperley et al. ............... | 714/48 |
| 7,076,688 B2 * | 7/2006 | Yamamoto ...................... | 714/6 |
| 7,120,709 B2 * | 10/2006 | Isobe et al. .................... | 710/38 |
| 7,281,172 B2 * | 10/2007 | Chujo ........................... | 714/48 |
| 7,328,260 B1 * | 2/2008 | Muthiyan et al. ........... | 709/224 |
| 2004/0044929 A1 * | 3/2004 | Chujo ........................... | 714/47 |
| 2005/0015685 A1 * | 1/2005 | Yamamoto .................... | 714/54 |
| 2005/0050269 A1 * | 3/2005 | Horn .......................... | 711/114 |
| 2005/0193238 A1 * | 9/2005 | Golasky et al. ................. | 714/6 |
| 2006/0031606 A1 * | 2/2006 | Isobe et al. ................... | 710/38 |
| 2006/0050647 A1 * | 3/2006 | Dugan et al. ................ | 370/252 |
| 2006/0230306 A1 * | 10/2006 | Richards et al. ................ | 714/7 |
| 2007/0124520 A1 * | 5/2007 | Harima et al. .............. | 710/104 |

FOREIGN PATENT DOCUMENTS

JP    5-204789 A    8/1993

* cited by examiner

*Primary Examiner*—Salad Abdullahi
*Assistant Examiner*—Hee Soo Kim
(74) *Attorney, Agent, or Firm*—Antonelli, Terry, Stout & Kraus, LLP.

(57) ABSTRACT

An information processing apparatus that enables easy identification of the cause of failure. The information processing apparatus has a transfer unit for transferring data between first equipment and second equipment. The information processing apparatus further includes an collection unit for collecting data that passes between the first equipment and the transfer unit as well as data that passes between the transfer unit and the second equipment and a first storage unit for storing the data collected by the collection unit.

9 Claims, 10 Drawing Sheets

FIG.7

| EXECUTION TIME MM/DD HH:MM:SS.mS.US | BUS TRACER | FIBRE CHANNEL TRACER | |
|---|---|---|---|
| 05/31 03:11:12.20.20 | DATA WRITE REQUEST COMMAND | | ...(C1) |
| 05/31 03:11:12.20.30 | WRITE DATA | | ...(C2) |
| 05/31 03:11:13.21.35 | | DATA WRITE REQUEST COMMAND | ...(C3) |
| 05/31 03:11:13.21.50 | | WRITE DATA | ...(C4) |
| 05/31 03:11:13.31.46 | | DATA WRITE REQUEST COMMAND | ...(C3) |
| 05/31 03:11:13.31.55 | | WRITE DATA | ...(C4) |
| . . . | | . . . | . . . |
| 05/31 03:11:14.30.20 | DATA WRITE REQUEST COMPLETED COMMAND | | ...(C5) |

FIG.8

| EXECUTION TIME MM/DD HH:MM:SS.mS.US | BUS TRACER | FIBRE CHANNEL TRACER | |
|---|---|---|---|
| 05/31 03:20:20.70.80 | DATA READ REQUEST COMMAND | | |
| 05/31 03:20:20.70.95 | | DATA READ REQUEST COMMAND | ⋯(C6) |
| 05/31 03:20:20.71.05 | | DATA READ REQUEST COMMAND | ⋯(C7) |
| . . . | . . . | . . . | ⋯(C7) |
| 05/31 03:20:20.81.02 | | READ DATA | ⋯(C8) |
| 05/31 03:20:20.81.28 | | READ DATA | ⋯(C8) |
| . . . | . . . | . . . | |
| 05/31 03:20:21.90.46 | READ DATA | | ⋯(C9) |
| 05/31 03:20:22.70.35 | DATA READ REQUEST COMPLETED COMMAND | | ⋯(C10) |

STORAGE SYSTEM, ADAPTER APPARATUS, INFORMATION PROCESSING APPARATUS AND METHOD FOR CONTROLLING THE INFORMATION PROCESSING APPARATUS

CROSS-REFERENCES TO RELATED APPLICATIONS

This application relates to and claims priority from Japanese Patent Application No. 2005-199341, filed on Jul. 7, 2005, the entire disclosure of which is incorporated herein by reference.

BACKGROUND OF THE INVENTION

The present invention relates to a storage system, adapter apparatus, information processing apparatus, and a method for controlling the information processing apparatus. The present invention is preferably applied to, for example, a storage system.

Conventionally, when a failure occurs in a storage system composed of, for example, a host computer, Fibre Channel switch, and storage apparatus, the cause of the failure is determined by analyzing data that has been transmitted and received and specifying an apparatus or a part therein that caused the failure.

In a conventional storage system, a host bus adapter provided between the host computer and the Fibre Channel switch is not equipped with the means for retrieving data that is useful in analyzing a failure. Therefore, a conventional storage system adopts a method for specifying the cause of the failure by reproducing the situation where the failure occurred based on logs for data that has been transmitted and received at each of the host computer and the storage apparatus.

This method has a problem in that the storage system has to be stopped in order to artificially reproduce the situation where the failure occurred and consequently requires substantial time to handle the failure.

In the meanwhile, as a method for retrieving data in the event of failure in a storage system, Japanese Patent Laid-Open (Kokai) Publication No. 1993-204789 proposes a method in which a peripheral control apparatus, which is provided between a host computer and a storage apparatus and has a predetermined structure, retrieves data triggered by a failure occurrence signal transmitted from the host computer, and transfers the retrieved data to the storage apparatus.

SUMMARY OF THE INVENTION

However, the failure-occurrence-signal-triggered data retrieval by the peripheral control apparatus disclosed in the above publication is not sufficient for a conventional storage system to specify the location of a failure; whether it occurred in the host computer, peripheral control apparatus, or storage apparatus.

Accordingly, the problem of taking substantial time to determine the cause of a failure still remains in a conventional storage system because it still needs to artificially reproduce the situation where the failure actually occurred, based on retrieved data.

In other words, the proposal of the peripheral control apparatus disclosed in the above publication cannot sufficiently solve the problem that determining the cause of a failure in a storage system takes substantial time.

The present invention has been devised in the light of the above-described problems. It is an object of the present invention to provide a storage system, adapter apparatus, information processing apparatus, and a method for controlling the information processing apparatus that allows easy determination of the cause of a failure.

In order to achieve the above object, the present invention provides a storage system that has: a host system; an adapter apparatus; and a storage apparatus. In this storage system, data transmitted from the host system is stored in the storage apparatus via the adapter apparatus and a network, and data stored in the storage apparatus is read out to the host system via the network and the adapter apparatus. The adapter apparatus has: a transfer unit for transferring data between the host system and the network; a first collection unit for collecting data that passes between the host system and the transfer unit; a second collection unit for collecting data that passes between the transfer unit and the network; and a transmission unit for transmitting the data collected by the first and second collection units to the host system. The host system has a first storage unit for storing the collected data transmitted from the adapter apparatus transfer unit.

The storage system allows easy determination of whether a failure has occurred in the host system, adapter apparatus, network, or storage apparatus based on retrieved data stored in the first storage unit.

The present invention further provides an adapter apparatus for transferring data transmitted from a host system to a storage apparatus via a network, and transferring data transmitted from the storage apparatus to the host system via the network. The adapter has: a transfer unit for transferring data between the host system and the storage apparatus; a first collection unit for collecting data that passes between the host system and the transfer unit; a second collection unit for collecting data that passes between the transfer unit and the storage apparatus; and a transmission unit for transmitting the data collected by the first and second collection units to an external storage unit.

With the adapter apparatus, it is possible to easily determine whether a failure has occurred in the host system, adapter apparatus, network, or storage apparatus based on the collected data stored in the storage unit.

Moreover, the present invention provides an information processing apparatus having a transfer unit for transferring data between first equipment and second equipment. The information processing apparatus further has: a collection unit for collecting data that passes between the first equipment and the transfer unit as well as data that passes between the transfer unit and the second equipment; and a first storage unit for storing the data collected by the collection unit.

The information processing apparatus makes it easy to determine whether a failure has occurred in the first equipment, the transfer unit, or the second equipment based on collected data stored in the first storage unit.

Furthermore, the present invention provides a method for controlling an information processing apparatus which has a transfer unit for transferring data between first equipment and second equipment. The method includes: a first step of collecting data that passes between the first equipment and the transfer unit as well as data that passes between the transfer unit and the second equipment; and a second step of storing the data collected in the first step in a first storage unit.

This method allows easy determination of whether a failure has occurred in the first equipment, the transfer unit, or the second equipment based on collected data stored in the first storage unit.

According to the present invention, in a storage system having a host system, an adapter apparatus, and a storage apparatus, data transmitted from the host system is stored in the storage apparatus via the adapter apparatus and a network, and data stored in the storage apparatus is read out to the host system via the network and the adapter apparatus; the adapter apparatus has a transfer unit for transferring data between the host system and the network, a first collection unit for collecting data that passes between the host system and the transfer unit, a second collection unit for collecting data that passes between the transfer unit and the network, and a transmission unit for transmitting the data collected by the first and second collection units to the host system; and the host system has a first storage unit for storing the collected data transmitted from the adapter apparatus transfer unit.

Therefore, whether or not a failure has occurred in the host system, adapter apparatus, network, or storage apparatus can be easily established based on collected data stored in the first storage unit. Thus, the present invention can realize a storage system that allows easy determination of the cause of a failure.

Moreover, according to the present invention, an adapter apparatus, which is for transferring data transmitted from a host system to a storage apparatus via a network, and transferring data transmitted from the storage apparatus to the host system via the network, has: a transfer unit for transferring data between the host system and the storage apparatus; a first collection unit for collecting data that passes between the host system and the transfer unit; a second collection unit for collecting data that passes between the transfer unit and the storage apparatus; and a transmission unit for transmitting the data collected by the first and second collection units to an external storage unit.

Therefore, whether a failure has occurred in the host system, adapter apparatus, network, or storage apparatus can be easily established based on collected data stored in the storage unit. Thus, the present invention can realize an adapter apparatus that allows easy determination of the cause of a failure.

Furthermore, according to the present invention, regarding an information processing apparatus having a transfer unit for transferring data between first equipment and second equipment and a method for controlling the information processing apparatus, data that passes between the first equipment and the transfer unit as well as data that passes between the transfer unit and the second equipment is collected; and the collected data is stored in the first storage unit. Therefore, whether a failure has occurred in the first equipment, the transfer unit, or the second equipment can be easily established. Accordingly an information processing apparatus and a method for controlling the information processing apparatus that allows easy determination of the cause of a failure can be realized.

BRIEF DESCRIPTION OF THE DRAWINGS

FIG. 7 is a schematic diagram illustrating examples of commands and data stored in an collected data storage area during data writing.

FIG. 8 is a schematic diagram illustrating examples of commands and data stored in the collected data storage area during data reading.

DETAILED DESCRIPTION OF THE INVENTION

An embodiment of the present invention is described below in detail with reference to the attached drawings.

(1) Structure of Storage System According to the Present Embodiment

Figure 1:
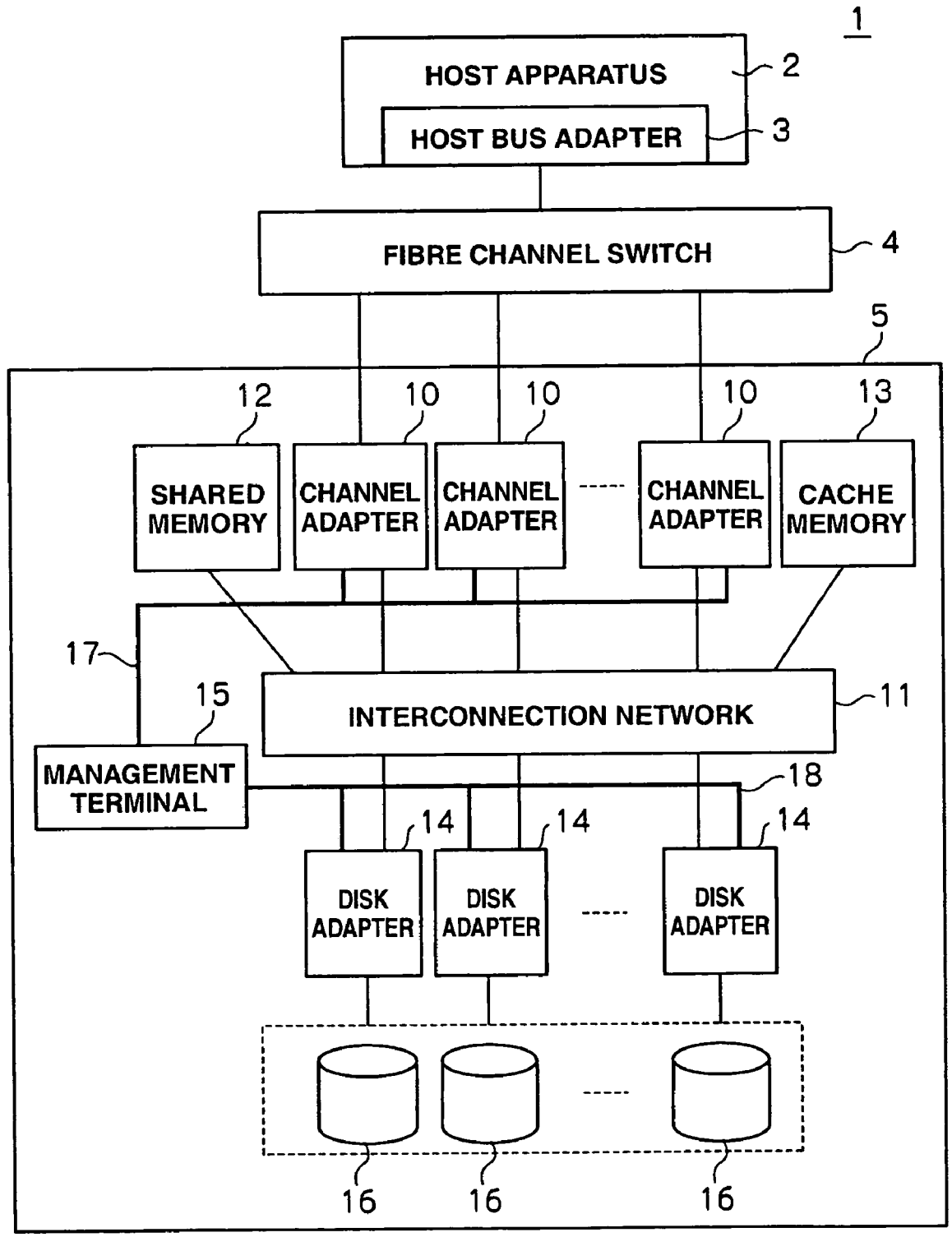
FIG. 1 is a block diagram indicating the structure of a storage system in an embodiment according to the present invention.

FIG. 1 shows the structure of a storage system 1 according to this embodiment. The storage system 1 is structured by connecting a host computer 2 to a Fibre Channel switch 4 via a host bus adapter 3 and also connecting the Fibre Channel switch 4 to a storage apparatus 5.

The host computer 2 is configured as a front-end apparatus such as a personal computer, work station, or mainframe computer. It reads and writes data from and to the storage apparatus 5 via both the host bus adapter 3 and the Fibre Channel switch 4.

The Fibre Channel switch 4 transmits and receives commands and data to and from the host computer 2 via the host bus adapter 3 in blocks, which are the units for data management in the storage resources provided by the host computer 2. The communication protocol used for communication between the host computer 2 and the storage apparatus 5 is Fibre Channel Protocol.

Incidentally, the host computer 2 and the storage apparatus 5 do not have to be connected via a SAN (Storage Area Network) composed of the Fibre Channel switch 4, but may be connected via a LAN (Local Area Network). For example, in the case where the host computer 2 and the storage apparatus 5 are connected via a LAN, commands and data are transmitted and received according to TCP/IP (Transmission Control Protocol/Internet Protocol). In this case, a LAN-compatible network card or the like may be employed instead of the host bus adapter 3.

The storage apparatus 5 includes a plurality of channel adapters 10, an interconnection network 11, shared memory 12, cache memory 13, a plurality of disk adapters 14, a management terminal 15, and a plurality of disk drives 16.

Each channel adapter 10 is configured as a micro computer system having a micro processor (not shown in the drawing), an internal memory (not shown in the drawing), and a communication interface etc. Each channel adapter 10 is assigned a network address (for example, a WWN (World Wide Name) or an IP (Internet Protocol) address) for identifying itself and is configured so that it can individually function as NAS (Network Attached Storage). Where there are plural host computers 2, the respective channel adapters 10 individually receive commands from the host computers 2.

The interconnection network 11 is connected to the channel adapters 10, shared memory 12, cache memory 13 and disk adapters 14. Transmission and receipt of commands and data between them are performed via the interconnection network 11. The interconnection network 11 is configured with a bus or a switch, such as a crossbar switch, that transmits data by high-speed switching.

The shared memory 12 and the cache memory 13 are storage memories shared among the channel adapters 10 and the disk adapters 14. The shared memory 12 is used mainly for storing control information and commands. The cache memory 13 is used mainly for temporarily storing data that is read from and written to the disk drives 16.

The management terminal 15 is a computer apparatus for maintaining and managing the entire storage apparatus 5 and the disk drives 16. It is connected to all the channel adapters 10 via a LAN 17 and also to all the disk adapters 14 via a LAN 18. Execution of software in the channel adapters 10 and the disk adapters 14 and changes in parameters are directed by the management terminal 15.

Each disk adapter 14 is configured as a micro computer system having a micro processor (not shown in the drawing) and an internal memory (not shown in the drawing) and has the relevant disk drive 16 execute processing such as writing and reading data in accordance with a command stored in the shared memory 12 by the relevant channel adapter 10. The disk adapters 14 control the disk drives 16 at a RAID level (for example, RAID0, RAID1, or RAID5) regulated by a so-called RAID (Redundant Array of Inexpensive Disks) system.

Each disk drive 16 is a hard disk drive such as an ATA (Advanced Technology Attachment) disk drive, an SCSI (Small Computer System Interface) disk drive, or a Fibre Channel disk drive. Disk devices in the disk drives 16 are operated by a RAID system. For a physical storage area provided by one or more disk devices, one or more logical volumes (hereinafter called "logical volumes") are set, in which data are stored.

The flow of data in the storage system 1 will now be described. When a command to write data in logical volumes in the storage apparatus 5 is input by a user, the host computer 2 transmits a corresponding data write request command and write data to a predetermined channel adapter 10 in the storage apparatus 5 via both the host bus adapter 3 and the Fibre Channel switch 4.

The channel adapter 10 that receives the data write request command writes the write command in the shared memory 12 and the write data in the cache memory 13. The disk adapters 14 monitor the shared memory 12 at all times and when the relevant disk adapter 14 detects that the data write request command has been written in the shared memory 12, it translates the logical address-specified data write request command to a physical address-specified data write request command, reads the write data from the cache memory 13, and writes it to the corresponding address in the relevant storage device.

When a command to read data written in a predetermined logical volume in the storage apparatus 5 is input by a user, the host computer 2 transmits a corresponding data read request command to a predetermined channel adapter 10 in the storage apparatus 5 via both the host bus adapter 3 and the Fibre Channel switch 4.

The channel adapter 10 that receives the data read request command writes it in the shared memory 12. When the relevant disk adapter 14 detects that the read command has been written in the shared memory 12, it translates the logical address-specified data read request command to a physical address-specified data read request command, and, based on the translated address, reads the designated data from the corresponding address in the relevant storage device.

The relevant disk adapter 14 then writes the data which has been read out from the storage device in the cache memory 13 and writes a data read request completed command in the shared memory 12. The channel adapters 10 always monitor the shared memory 12 and when the relevant channel adapter 10 detects that the data read request completed command has been written in the shared memory 12, it reads the read data from the cache memory 13 in accordance with the data read request completed command and transmits it to the host computer 2 via both the Fibre Channel switch 4 and the host bus adapter 3.

(2) Structure of Host Computer 2

Figure 2:
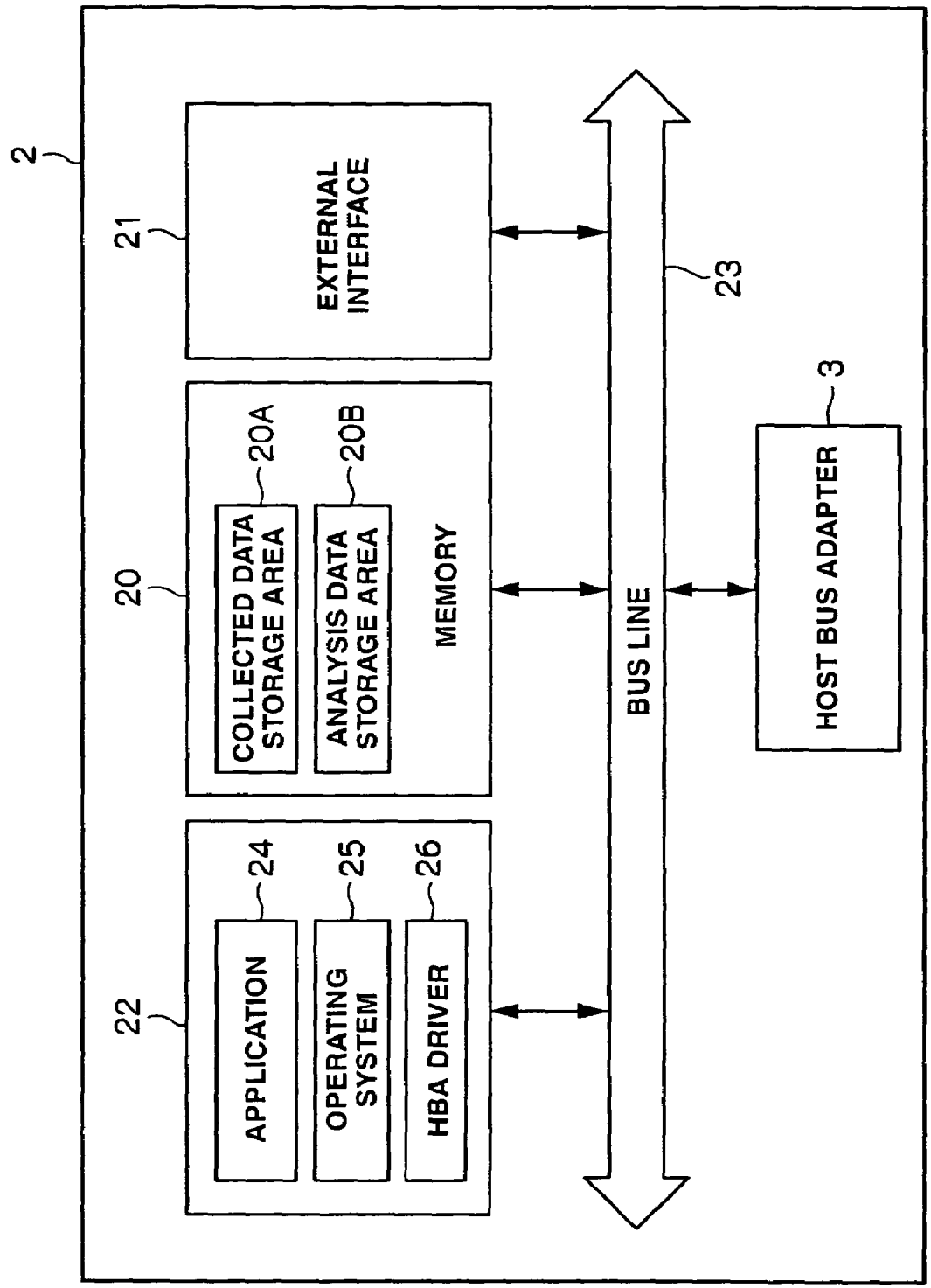
FIG. 2 is a block diagram indicating the structure of a host computer.

FIG. 2 shows a specific structure of the host computer 2 according to the present embodiment. As is clear from FIG. 2, the host computer 2 is structured by connecting a memory 20, an external interface 21, a CPU (Central Processing Unit) 22, and the host bus adapter 3 via a bus line 23.

The memory 20 is an auxiliary memory apparatus composed of, for example, a hard disk drive, and stores various control programs. The memory 20 provides a collected data storage area 20A for storing collected data and an analysis data storage area 20B for storing analysis data, which is for analyzing troubles, both of which will be described later.

The external interface 21 has the function of connecting the host computer 2 to external equipment and is connected to information input apparatuses (not shown in the drawing) such as a keyboard, pointing device, and microphone as well as to information output apparatuses (not shown in the drawing) such as a monitor display and speaker(s).

The CPU unit 22 is a computer apparatus having information processing resources such as a CPU (not shown in the drawing) and an internal memory (not shown in the drawing). The CPU unit 22 executes various processing by running various control programs stored in the memory 20 in its internal memory.

An application 24, an operating system 25, and a driver for the host bus adapter 3 (hereinafter called the "HBA driver") are run in the internal memory of the CPU unit 22.

The application 24 is software operating on the operating system 25 and, based on a user's operation of an operation unit (not shown in the drawing), generates commands that are transmitted and received inside the host computer 2 and between the host computer 2 and the storage apparatus 5, and executes processing based on the commands.

The operating system 25 is basic software for controlling the entire host computer 2. For example, it manages hardware such as the above-described input/output apparatuses (not shown in the drawing), the host bus adapter 3, and the memory 20; and relays commands transmitted between the application 24 and drivers for input/output apparatuses (not shown in the drawing), the HBA driver 26, and the memory 20. The HBA driver 26 controls the host bus adapter 3 in accordance with commands received from the operating system 25 and the host bus adapter 3.

(3) Structure of Host Bus Adapter 3

Figure 3:
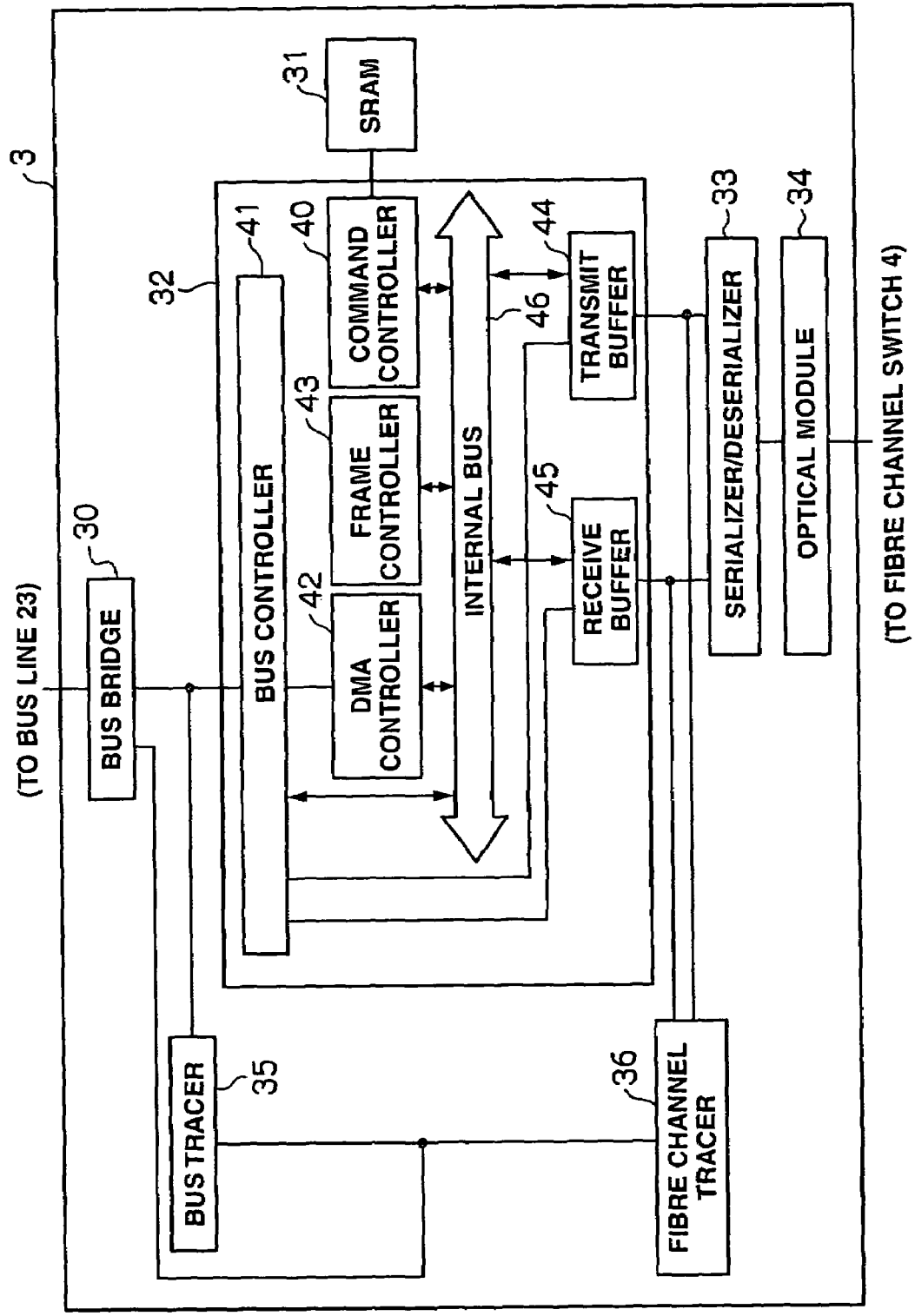
FIG. 3 is a block diagram indicating the structure of a host bus adapter.

FIG. 3 shows the specific structure of the host bus adapter 3. The host bus adapter 3 includes a bus bridge 30, SRAM (Static Random Access Memory) 31, an adapter control unit 32, a serializer/deserializer (SerDes), an optical module 34, a bus tracer 35, and a Fibre Channel tracer 36.

The bus bridge 30 has the function of relaying commands and data between the host computer 2 and the host bus adapter 3. It transmits commands and data received from the host computer 2 to the adapter control unit 32, and also transmits commands and data received from the adapter control unit 32 to the host computer 2.

The SRAM 31 is a memory apparatus for temporarily accumulating commands transmitted from the host computer 2, and stores various control programs for operating the adapter control unit 32. The SRAM 31 also stores data write request commands and data read request commands.

The adapter control unit 32 is structured by interconnecting a command controller 40, a bus controller 41, a DMA controller 42, a frame controller 43, a transmit buffer 44, and a receive buffer 45 via an internal bus 46.

The adapter control unit 32 is configured as a micro computer system having a micro processor (not shown in the drawing) and an internal memory (not shown in the drawing). It DMA (Direct Memory Access) transfers data between the host computer 2 and the storage apparatus 5 in accordance with data write request commands and data read request commands stored in the SRAM 31.

Incidentally, the command controller 40, bus controller 41, DMA controller 42, and frame controller 43 are firmware that execute various processing as various control programs stored in the SRAM 31 are run in the internal memory (not shown in the drawing) of the adapter control unit 32 and executed by the micro processor (not shown in the drawing).

The command controller 40 translates data write request commands and data read request commands stored in the SRAM 31 to commands that can be executed by the bus controller 41, DMA controller 42, and frame controller 43.

The bus controller 41 controls the bus line 23 of the host computer 2 in accordance with data write request commands and data read request commands. The DMA controller 42 DMA-transfers data between the host computer 2 and the storage apparatus 5 in accordance with data write request commands and data read request commands.

The frame controller 43 executes, in accordance with a data write request command or a data read request command, division processing and header setting processing for data accumulated in the transmit buffer 44 or join processing for data accumulated in the receive buffer 45.

The transmit buffer 44 and the receive buffer 45 are memory apparatuses for temporarily accumulating data transmitted between the host bus adapter 3 and the Fibre Channel switch 4. The transmit buffer 44 stores data to be transmitted to the storage apparatus 5. The receive buffer 45 stores data to be received from the storage apparatus 5.

The serializer/deserializer 33 is a circuit that executes 8 bit/10 bit conversion for commands and data. For example, it serializes and converts 8-bit parallel bus signals into serial signals so that they can be transmitted to a single transmission line, and it also converts serial signals received via a single transmission line to 8-bit parallel signals.

The optical module 34 is an electronic component for converting electronic signals to optical signals and vice versa. For example, it converts electronic signals to optical signals by means of a luminous element such as a Laser Diode (LD) or a Light Emitting Diode (LED) and also converts optical signals to electronic signals by means of, for example, a photo diode (PD) and an Avalanche Photo Diode (APD).

The bus tracer 35 is configured as a micro computer system having a micro processor (not shown in the drawing) and an internal memory (not shown in the drawing). It collects commands and data when they pass between the bus bridge 30 and the adapter control unit 32. It also stores the collected commands and data in the collected data storage area 20A.

The Fibre Channel tracer 36 is configured as a micro computer system having a micro processor (not shown in the drawing) and an internal memory (not shown in the drawing). It collects commands and data when they pass between the adapter control unit 32 and the serializer/deserializer 33. It also stores the collected commands and data in the collected data storage area 20A.

Next, the flow of data in the host computer 2 is described. When a command to write data in logical volumes in the storage apparatus 5 is input by a user, the application 24 in the host computer 2 transmits a corresponding data write request command to the HBA driver 26 via the operating system 25.

The HBA driver 26, which receives the SCSI protocol-based data write request command, converts it into a data write request command based on Fibre Channel Protocol and transmits it to the host bus adapter 3. Consequently, the data write request command is stored in the SRAM 31 via the bus bridge 30, the bus controller 41, the internal bus 46 and the command controller 40.

The command controller 40 monitors the SRAM 31 at all times and when it detects that the data write request command has been written in the SRAM 31, it converts it into to a data write request command that can be executed by the bus controller 41, DMA controller 42, and frame controller 43. Then, the command controller 40 reads the data write request command stored in the SRAM 31 and transmits it to the bus controller 41, the DMA controller 42, and the frame controller 43 via the internal bus 46.

Having received the data write request command, the bus controller 41 secures the bus line 23 to read out write data from the memory 20 and reads the write data via the bus line 23.

The DMA controller 42, which also has received the data write request command, DMA-transfers the write data read by the bus controller 41 to the transmit buffer 44. Then, it divides the write data accumulated in the transmit buffer 44 according to the disk drives 16 in which the write data are to be written; sets headers and CRC (Cyclic Redundancy Check) codes etc.; and transmits them with the data write request command to the Fibre Channel switch 4 via the serializer/deserializer 33 and the optical module 34.

When all data write request commands stored in the SRAM 31 are completed, the command controller 40 generates a data write request completed command and transmits it to the HBA driver 26 via the internal bus 46, the bus controller 41, the bus bridge 30, and the bus line 23.

Meanwhile, when a command to read data stored in predetermined logical volumes in the storage apparatus 5 is input by a user, the host computer 2 transmits a corresponding data read request command to the HBA driver 26 via the operating system 25.

The HBA driver 26, which receives the SCSI protocol-based data read request command, converts it a data read request command based on Fibre Channel Protocol, and stores it in the SRAM 31 via the bus bridge 30, bus controller 41, internal bus 46 and command controller 40.

When the command controller 40, always monitoring the SRAM 31, detects that that the data read request command has been written in the SRAM 31, it converts it to a data read request command that can be executed by the bus controller 41, DMA controller 42, and frame controller 43. Then, it reads the converted data read request command stored in the SRAM 31 and transmits it to the frame controller 43, DMA controller 42, and bus controller 41 via the internal bus 46.

Having received the data read request command, the frame controller 43 transmits it to the Fibre Channel switch 4 via the serializer/deserializer 33 and the optical module 34. As a result, the receive buffer 45 receives the read data stored in the respective disk drives 16 via the optical module 34 and the serializer/deserializer 33. Then, the frame controller 43 joins the read data stored in the respective disk drives 16, detects any data errors by means of a CRC or parity check, and executes any necessary error correction.

The DMA controller 42, also having received the data read request command, DMA-transfers the read data accumulated in the receive buffer 45 to the bus controller 41. The bus controller 41, which also has received the data read request command, secures the bus line 23 to write the read data in the memory 20, and writes the read data in the memory 20 via the bus line 23.

When all of the data read request commands stored in the SRAM 31 are completed, the command controller 40 generates a data read request completed command and transmits it to the HBA driver 26 via the internal bus 46, bus controller 41, bus bridge 30, and bus line 23.

(4) Data Collection Processing

Figure 4:
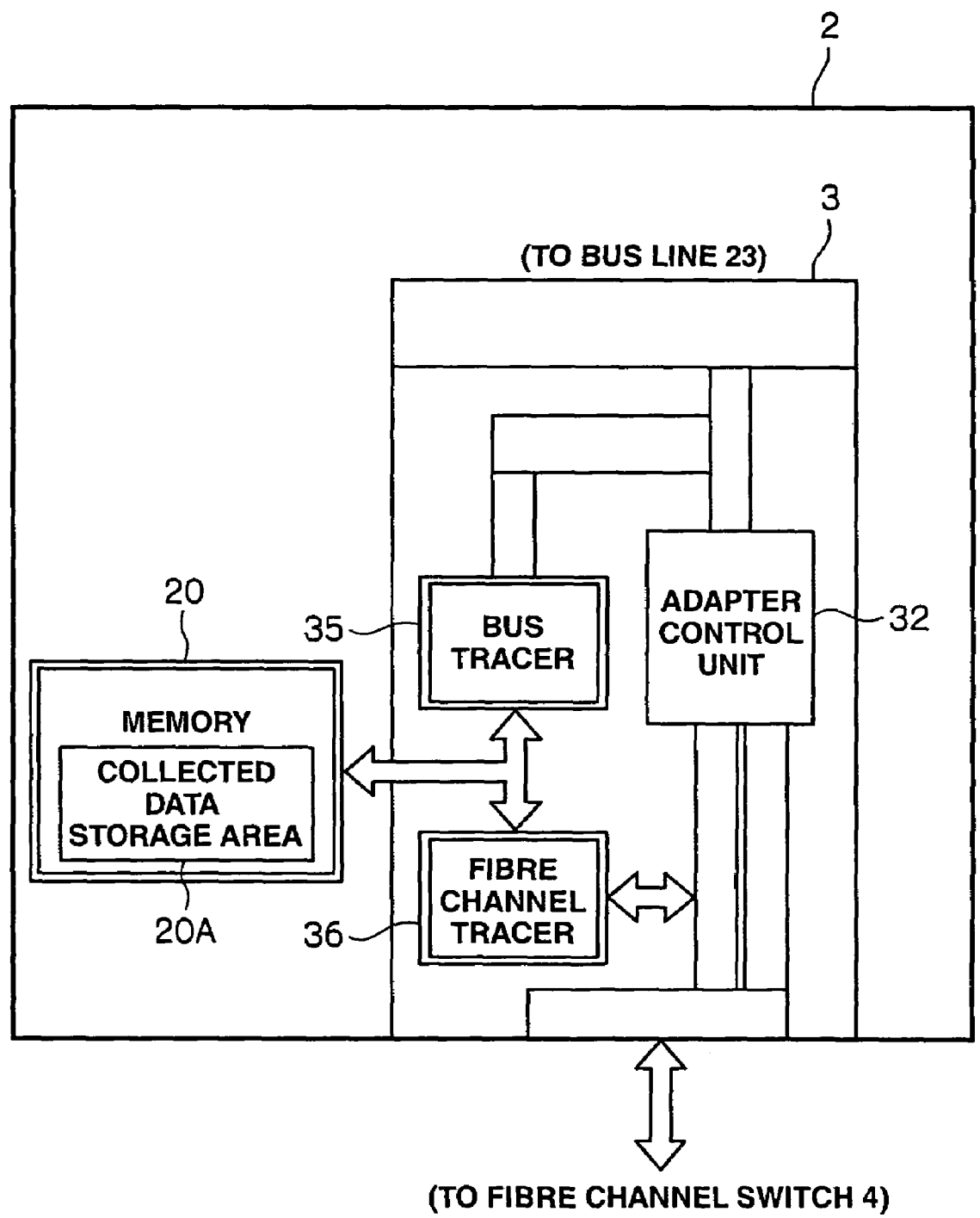
FIG. 4 is a schematic diagram illustrating data collection processing.

Next, data collection processing according to the present embodiment is described with reference to FIGS. 4 through 8. FIG. 4 is a schematic functional diagram regarding the data collection processing. The bus tracer 35 collects commands and data when they pass between the bus bridge 30 and the adapter control unit 32. The Fibre Channel tracer 36, on the other hand, collects commands and data when they pass between the adapter control unit 32 and the serializer/deserializer 33. Then, the bus tracer 35 and the Fibre Channel switch 36 store the commands and data they have collected in the collected data storage area 20A in the memory 20.

Figure 5:
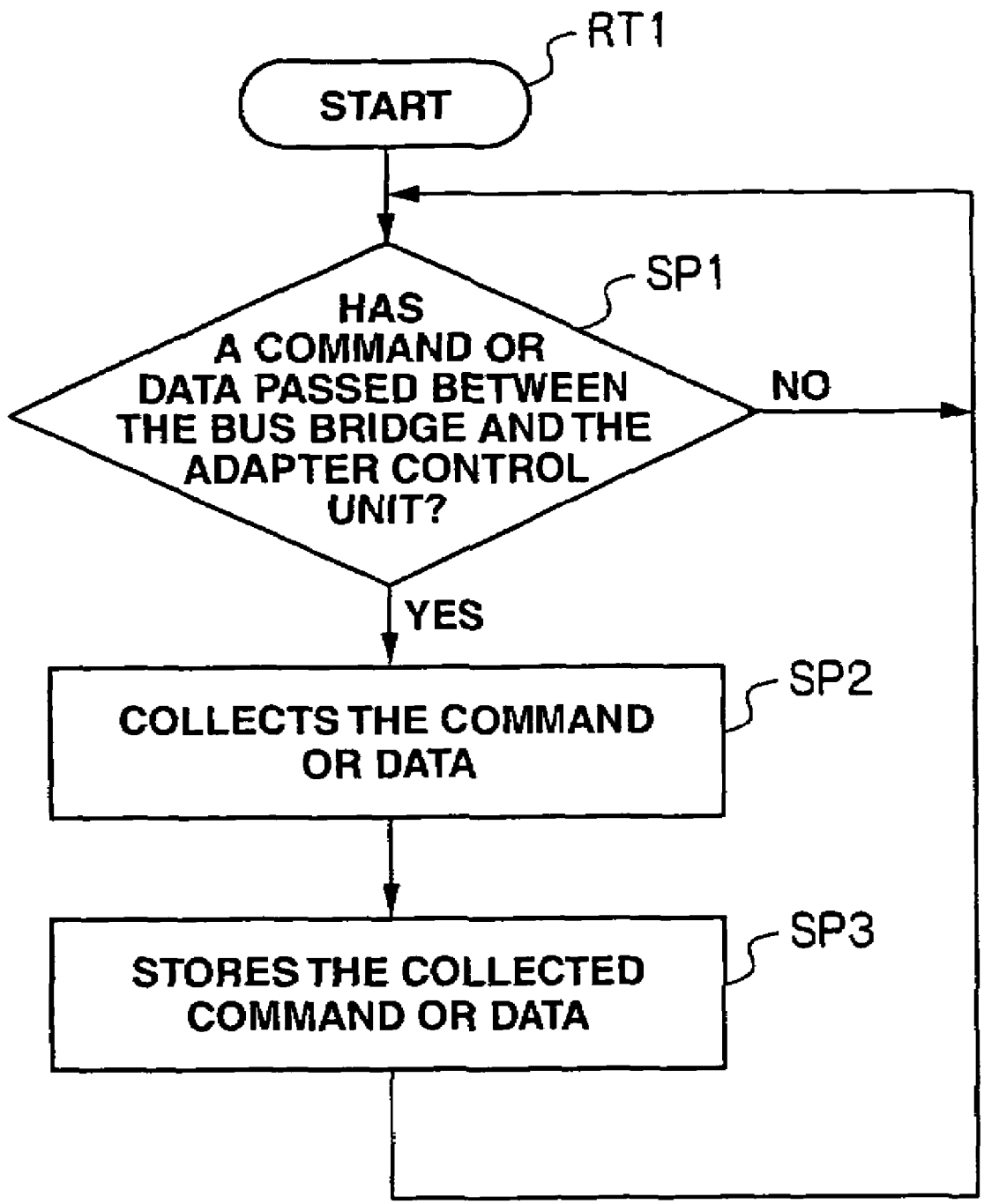
FIG. 5 is a flow chart indicating a data collection processing routine during data writing.

FIG. 5 is a flow chart illustrating the specific processing routine for data collection processing executed by the bus tracer 35. At the initial stage, the bus tracer 35 waits in standby mode for commands and data to pass between the bus bridge 30 and the adapter control unit 32 according to the data collection processing routine RT1 shown in FIG. 5 (SP1).

When a command and data passe between the bus bridge 30 and the adapter control unit 32 (SP1; Yes), the bus tracer 35 collects the command and data (SP2).

The bus tracer 35 then stores the collected command and data as a piece of collected data in the collected data storage area 20A together with the time of collection (SP3).

The bus tracer 35 then returns to standby mode to wait for another command and data to pass between the bus bridge 30 and the adapter control unit 32 (SP1), and thereafter repeats the same steps (SP1→SP3→SP1)

Figure 6:
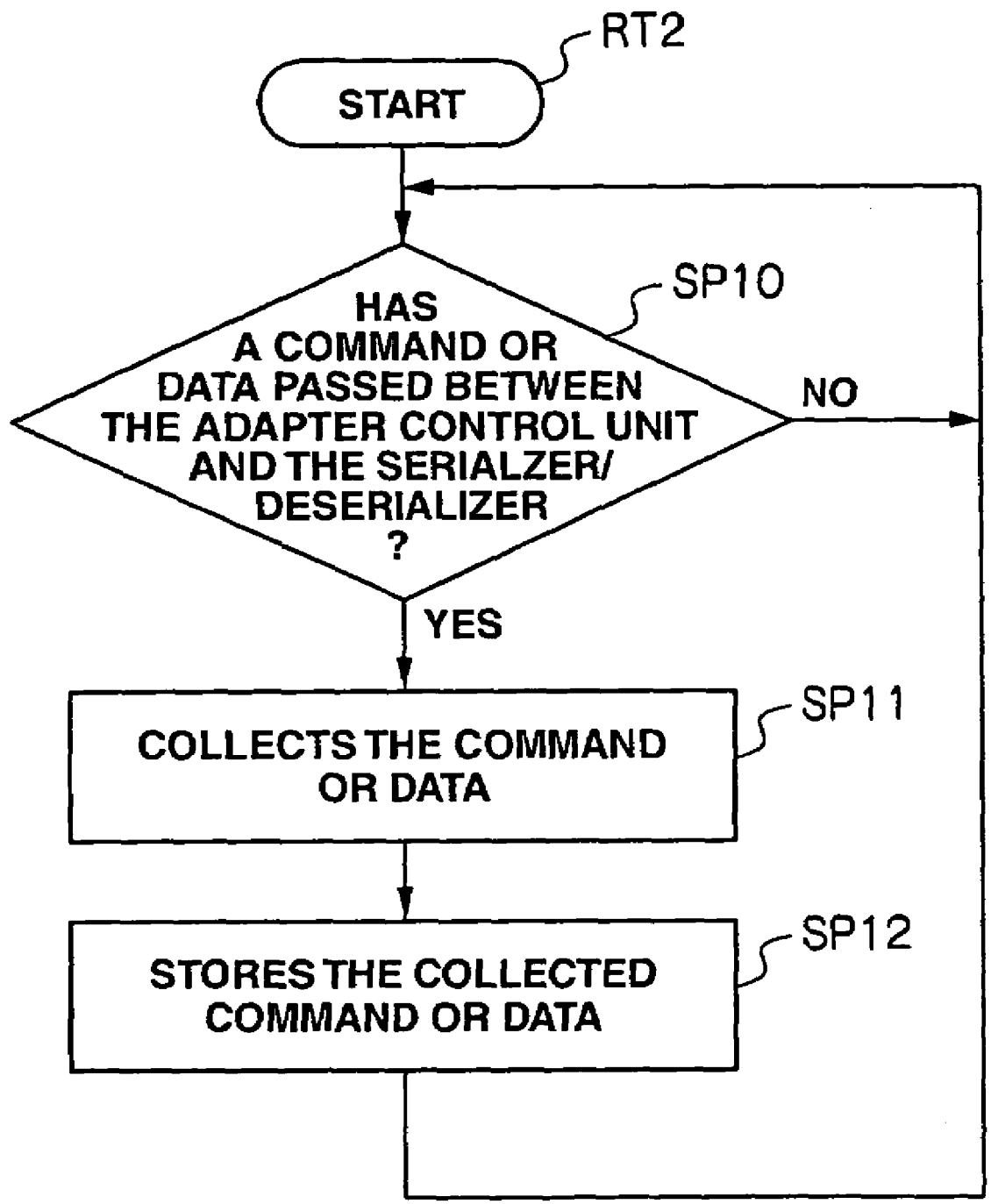
FIG. 6 is a flow chart indicating a data collection processing routine during data reading.

FIG. 6 is a flow chart illustrating the specific processing routine for data collection processing executed by the Fibre Channel tracer 36. At the initial stage, the Fibre Channel tracer 36 waits in standby mode for commands and data to pass between the adapter control unit 32 and the serializer/ deserializer 33 according to the data collection processing routine RT2 shown in FIG. 6 (SP10).

When a command and data pass between the adapter control unit 32 and the serializer/deserializer 33 (SP10; Yes), the Fibre Channel tracer 36 collects the command and data (SP11).

Subsequently, the Fibre Channel tracer 36 stores the collected command and data as a piece of collected data in the collected data storage area 20A together with the time of collection (SP12).

Then, the Fibre Channel tracer 36 returns to standby mode to wait for another command and data to pass between the adapter control unit 32 and the serializer/deserializer 33 (SP10) and thereafter repeats the same steps (SP10→SP12→SP10).

FIG. 7 shows examples of a command and data stored in the collected data storage area 20A during the time from the transmission of a data write request command from the application 24 to the receipt of a data write request completed command by the HBA driver 26.

For example, as described above in relation to the data flow in the host computer 2, when the bus bridge 30 transmits a data write request command to the adapter control unit 32, the bus tracer 35 collects the data write request command as well as the time of collection and stores them in the collected data storage area 20A and establishes an association therebetween (C1).

Also, as described above in the same section explaining the data flow in the host computer 2, when the bus bridge 30 transmits write data to the adapter control unit 32, the bus tracer 35 collects the write data as well as the time of collection, and stores them in the collected data storage area 20A and establishes an association therebetween (C2).

Moreover, as described above in the same section, when the adapter control unit 32 transmits the above-described data write request command to the serializer/deserializer 33, the Fibre Channel tracer 36 collects the data write request command as well as the time of collection and stores them in the collected data storage area 20A and establishes an association therebetween (C3).

Furthermore, as described in the same section, when the adapter control unit 32 transmits the above-described write data to the serializer/deserializer 33, the Fibre Channel tracer 36 collects the write data as well as the time of collection and stores them in the collected data storage area 20A and establishes an association therebetween (C4).

Also, as described in the same section, when the adapter control unit 32 transmits a data write request completed command to the bus bridge 30, the bus tracer 35 collects the data write request completed command as well as the time of collection and stores them in the collected data storage area 20A and establishes an association therebetween (C5).

FIG. 8 shows examples of a command and data stored in the collected data storage area 20A during the time from the transmission of a data read request command from the application 24 to the receipt of a data read request completed command by the HBA driver 26.

For example, as described above in relation to the data flow in the host computer 2, when the bus bridge 30 transmits a data read request command to the adapter control unit 32, the bus tracer 35 collects it as well as the time of collection and stores them in the collected data storage area 20A and establishes an association therebetween (C6).

Also, as described above in the same section explaining the data flow in the host computer 2, when the adapter control unit 32 transmits the data read request command to the serializer/ deserializer 33, the Fibre Channel tracer 36 collects it as well as the time of collection and stores them in the collected data storage area 20A and establishes an association therebetween (C7).

Moreover, as described above in the same section, when the adapter control unit 32 transmits read data to the serializer/deserializer 33, the Fibre Channel tracer 36 collects it as well as the time of collection and stores them in the collected data storage area 20A and establishes an association therebetween (C8).

Furthermore, as described in the same section, when the adapter control unit 32 transmits the above-described read data to the bus bridge 30, the bus tracer 35 collects the read data as well as the time of collection and stores them in the collected data storage area 20A and establishes an association therebetween (C9).

Again as described in the same section, when the adapter control unit 32 transmits a data read request completed command to the bus bridge 30, the bus tracer 35 collects it as well as the time of collection and stores them in the collected data storage area 20A and establishes an association therebetween (C10).

Incidentally, when the bus tracer 35 and the Fibre Channel tracer 36 detect that there is no available space in the collected data storage area 20A, they delete commands and data stored therein beginning with those collected earliest.

5) Analysis Data Retrieval Processing

Next, analysis data retrieval processing executed by the host computer 2 is described with reference to FIG. 9 and FIG. 10. One of the characteristics of the host computer 2 in this embodiment is that when a failure occurs in the host computer 2 itself, the host bus adapter 3, the Fibre Channel switch 4, or the storage apparatus 5, relevant command(s) and data are retrieved from the commands and data stored in the collected data storage area 20A and stored in an analysis data storage area 20B.

Figure 9:
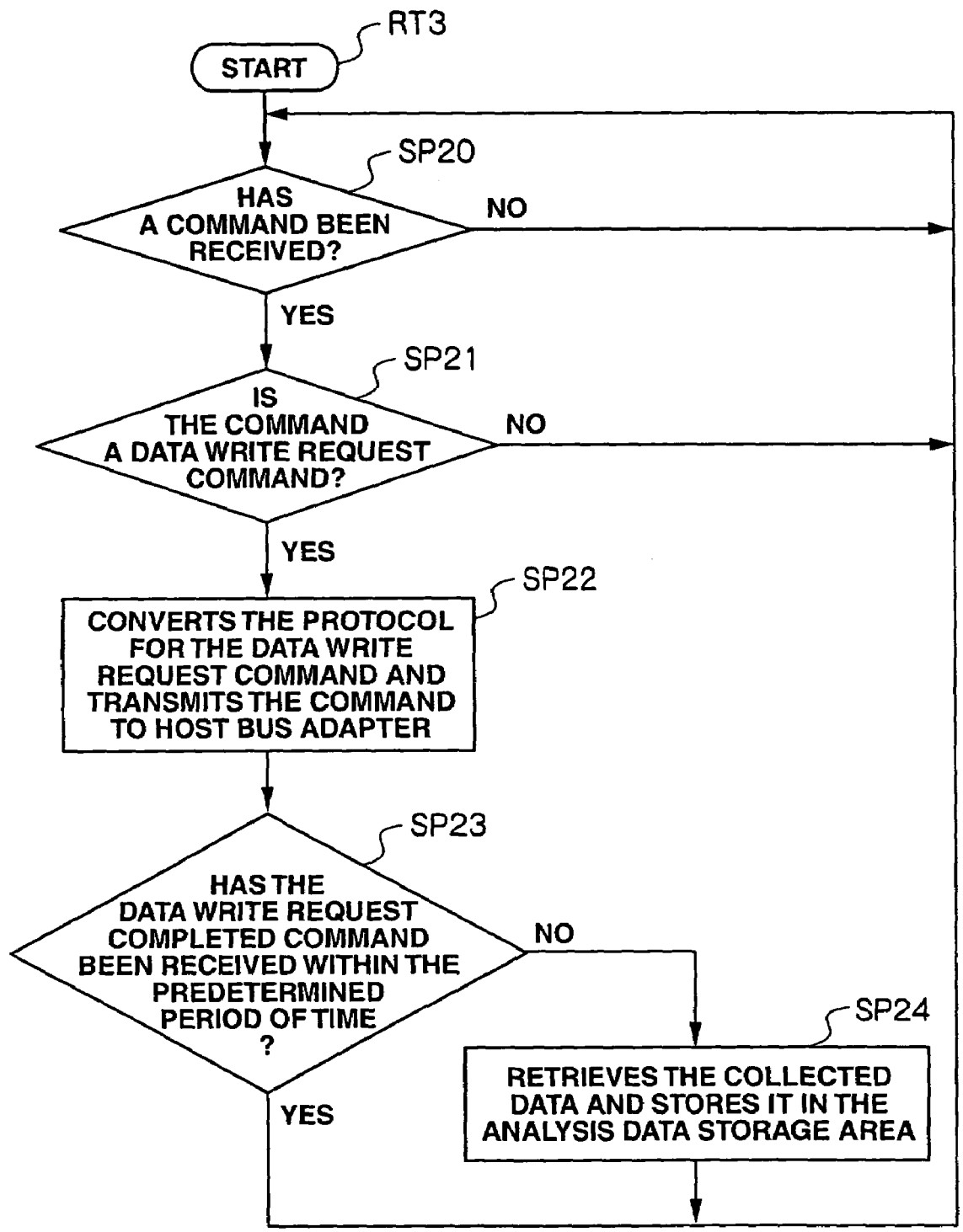
FIG. 9 is a flow chart indicating an analysis data retrieval processing routine during data writing.

FIG. 9 is a flow chart indicating the specific processing routine for the analysis data retrieval processing executed by the HBA driver 26 in the host computer 2 during data writing. At the initial stage, the HBA driver 26 waits in standby mode for a command to be transmitted from the application 24 via the operating system 25, according to the analysis data retrieval processing routine during data writing RT3 (SP20).

Then, when the HBA driver 26 receives a command from the application 24 via the operating system 25 (SP20; Yes), it checks whether or not the command is a data write request command (SP21).

If the command is not a data write request command (SP21; No), the HBA driver 26 returns to standby mode to wait for another command to be transmitted from the application 24 via the operating system 25 (SP20). On the other hand, if the command is a data write request command (SP21; Yes), the HBA driver 26 converts the SCSI protocol-based data write request command into a command based on Fibre Channel Protocol and transmits it to the host bus adapter 3 (SP22).

The HBA driver 26 then waits in standby mode for a data write request completed command, which indicates that all data write request commands have been completed (SP23).

If the HBA driver 26 has not received a data write request completed command within a predetermined period of time (SP23; No), it judges that some kind of failure has occurred in the host computer 2, host bus adapter 3, or storage apparatus 5; and, using the time when the predetermined period of time has elapsed as a reference time, retrieves pieces of collected data that have been collected a predetermined period of time before and after the reference time from the collected data storage area 20A; and stores them in the analysis data storage area 20B (SP24).

Examples of where a data write request completed command has not been received within the predetermined period of time may include: when "Link_Down" is detected in the DMA controller 42, that is, when it is detected that an optical cable has been pulled out; when "Chip_Reset" is detected in the DMA controller 42, that is, when the adapter control unit 32 proceeds to reset mode during DMA transfer; and when "CRC_Error" is detected in the frame controller 43, that is, when errors (burst errors) are detected continuously more than a predetermined number of times.

Incidentally, if any of the above failures has occurred, a failure occurrence command may be generated at the DMA command controller or the frame controller 43 and transmitted to the HBA driver 26. If this measure is taken, the HBA driver 26 can retrieve, using the time when it received a failure occurrence command as a reference time, pieces of collected data that have been collected a predetermined period of time before and after the reference time from the collected data storage area 20A, and store them in the analysis data storage area 20B.

Then, the HBA driver 26 returns to standby mode to wait for another command to be transmitted from the application 24 via the operation system 25 (SP20) and thereafter repeats the same steps (SP20→SP24→SP20).

When the HBA driver 26 has received a data write request completed command within the predetermined period of time, it directly returns to standby mode to wait for another command to be transmitted from the application 24 via the operating system (SP20) and thereafter repeats the same steps (SP20→SP24→SP20).

Figure 10:
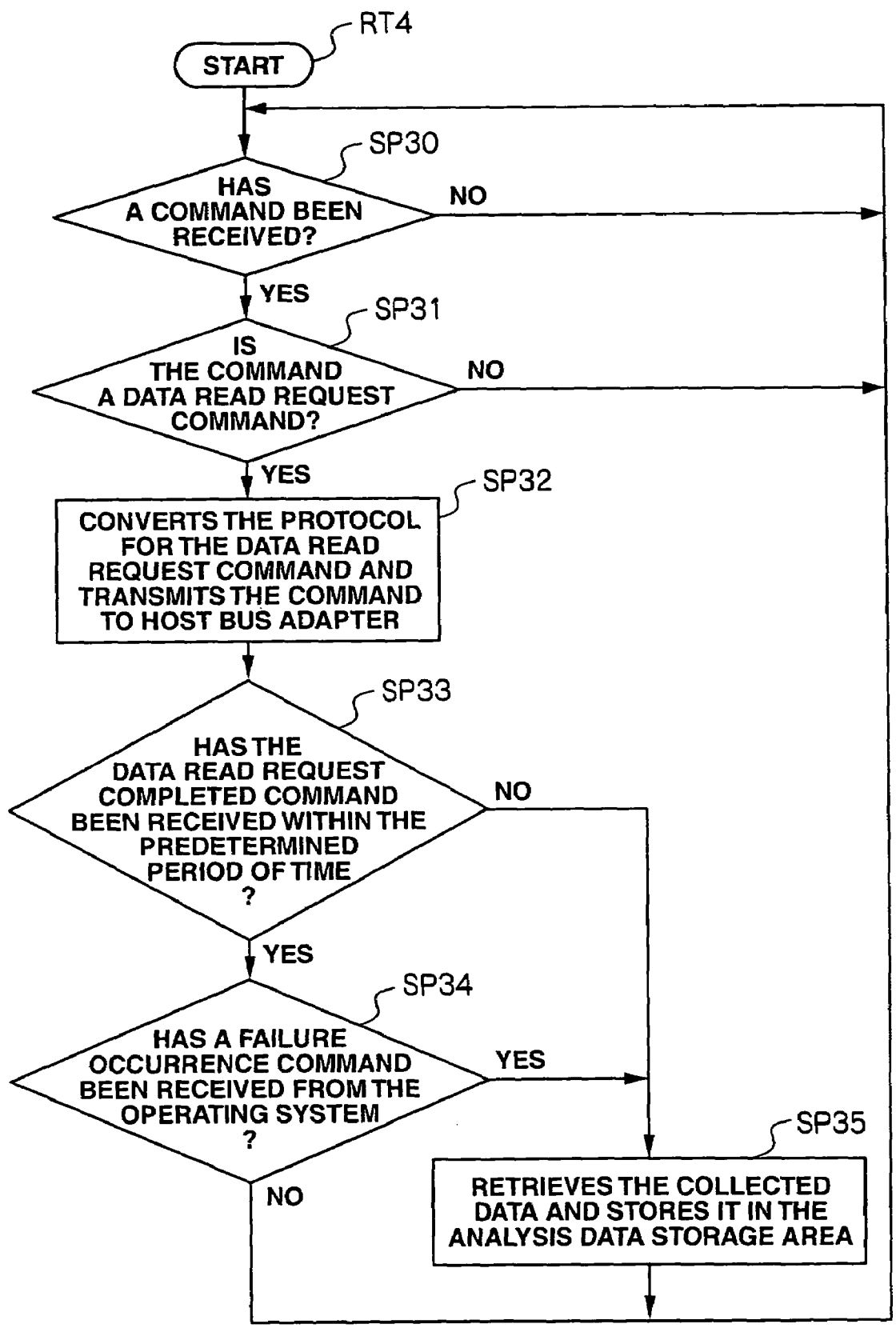
FIG. 10 is a flow chart illustrating an analysis data retrieval processing routine during data reading.

FIG. 10 is a flow chart indicating the specific processing routine for analysis data retrieval processing executed by the HBA driver 26 in the host computer 2 during data reading. At the initial stage, the HBA driver 26 waits in standby mode for a command to be transmitted from the application 24 via the operating system 25 according to the analysis data retrieval processing routine during data reading RT4 (SP30).

When the HBA driver 26 receives a command from the application 24 via the operating system 25 (SP30; Yes), it checks whether or not the command is a data read request command (SP31).

If the command is not a data read request command (SP31; No), the HBA driver returns to standby mode to wait for another command to be transmitted from the application 24 via the operating system 25 (SP30). On the other hand, if the command is a data read request command (SP31; Yes), the HBA driver 26 converts the SCSI protocol-based data read request command to a command based on Fibre Channel Protocol and transmits it to the host bus adapter 3 (SP32).

The HBA driver 26 then waits in standby mode for a data read request completed command, which indicates that all data read request commands have been completed (SP33).

If the HBA driver 26 has received a data read request completed command within a predetermined period of time (SP33; Yes), it checks whether or not it has received a failure occurrence command (SP34).

However, if the HBA driver 26 has not received a data read request completed command within a predetermined period of time (SP33; No), or if it has received a failure occurrence command from the operating system 25 (SP34; Yes), it judges that some kind of failure has occurred in the host computer 2, host bus adapter 3, or storage apparatus 5; and, while using the time when the predetermined period of time has elapsed is a reference time, retrieves pieces of collected data that have been collected a predetermined period of time before and after the reference time from the collected data storage area 20A; and stores them in the analysis data storage area 20B (SP35).

Specific examples of when a data read request completed command has not been received within the predetermined period of time may include the cases previously described above in relation to when a data write request completed command has not been received in the predetermined period of time in the analysis data retrieval processing routine during data writing RT3.

Specific examples of when the HBA driver 26 receives a failure occurrence command may include: when "Master Abort" is detected in the operating system 25, that is, when an attempt was made to write data to an address position other than the one designated by the operating system 25; and when "Bad Trap" is detected in the operating system 25, that is, when an attempt was made to write data at a null address. In these cases, the operating system 25 detects "OS Panic" and transmits a failure occurrence command to the HBA driver 26.

More specific examples of when the HBA driver 26 receives a failure occurrence command may include: when "Data Corrupt" is detected in the application 24, that is, when the application 24 detects data corruption when it actually attempts to use the data; and when "Data Compare Error" is detected in the application 24, that is, when the application 24 compares data written in the memory 20 with read-requested data and the written data is different from the read-requested data. In these cases, the application 24 transmits a failure occurrence command to the HBA driver 26 via the operating system 25.

Then, the HBA driver 26 returns to standby mode to wait for another command to be transmitted from the application 24 via the operating system 25 (SP30) and repeats the same steps (SP 30→SP35→SP30).

On the other hand, if no failure has occurred in the operating system 25 and the application 24 and the HBA driver 26 therefore has not received a failure occurrence command, it returns to standby mode to wait for another command to be transmitted from the application 24 via the operating system 25 (SP30) and repeats the same steps (SP30→SP35→SP30).

Incidentally, when the HBA driver 26 judges that a failure has occurred, it may report that fact using a speaker (not shown in the drawing) or a display unit (not shown in the drawing). Moreover, when it judges that a failure has occurred, or, when prompted by an operator via an operation unit (not shown in the drawing), it may display on the display unit (not shown in the drawing) commands and data stored in the analysis data storage area 20B by arranging them in chronological order as shown in the tables in FIG. 6 and FIG. 7.

As explained, with the storage system 1, because commands and data are collected between the bus bridge 30 and the adapter control unit 32 as well as between the adapter control unit 32 and the serializer/deserializer 33 and stored in the collected data storage area 20A, it is possible to judge with ease whether a failure has occurred in the host computer 2, host bus adapter 3, Fibre Channel switch 4, or storage apparatus 5 based on the commands and data stored in the collected data storage area 20A.

Moreover, with the storage system 1, when a failure has occurred in the host computer 2, host bus adapter 3, Fibre Channel switch 4, or storage apparatus 5, relevant commands and data are retrieved from those commands and data stored in the collected data storage area 20A and stored in the analysis data storage area 20B, making it possible to judge with more ease whether the failure has occurred in the host computer 2, host bus adapter 3, Fibre Channel switch 4, or storage apparatus 5 based on the commands and data stored in the analysis data storage area 20B.

Furthermore, with the storage system 1, when collecting commands and data between the bus bridge 30 and the adapter control unit 32 and between the adapter control unit 32 and the serializer/deserializer 33, the collection times are also collected and stored in the collected data storage area 20A and associations between the commands and data and the collection times are established. Therefore, it is possible to judge with further ease whether the failure has occurred in the host computer 2, host bus adapter 3, Fibre Channel switch 4, or storage apparatus 5 based on the commands, the data, and the times stored in the collected data storage area 20A.

Yet, with the storage system 1, because commands and data that have been collected a predetermined period of time before and after the occurrence of failure are retrieved, it is possible to judge whether the failure has occurred in the host computer 2, host bus adapter 3, Fibre Channel switch 4, or the storage apparatus with a simple procedure, based on the commands and data stored in the analysis data storage area 20B.

The present invention can be widely applied to network systems of various forms.

What is claimed is:

1. A storage system comprising:
    a host system which includes a processor, a memory and a host bus adapter apparatus, wherein the host bus adapter apparatus is coupled to the processor and the memory by an internal bus and wherein the processor includes an operating system and a host bus adapter driver which controls the host bus adapter in accordance with commands from the operating system and the host bus adapter; and
    a storage apparatus connected to the host bus adapter apparatus of the host system via a network such that the network separates the storage apparatus from the host bus adapter apparatus,
    wherein data transmitted from the host system is stored in the storage apparatus via the host bus adapter apparatus and the network, and data stored in the storage apparatus is read out to the host system via the network and host bus adapter apparatus;
    wherein the host bus adapter apparatus comprises: a transfer unit for transferring data between the internal bus of the host system and the network; a first collection unit for collecting data that passes between the internal bus of the host system and the transfer unit; a second collection unit for collecting data that passes between the transfer unit and the network; and a transmission unit for transmitting the data collected by the first and second collection units to the internal bus of the host system;
    wherein the host system further comprises a first storage unit in the memory for storing the collected data transmitted from the host bus adapter apparatus transfer unit, and
    wherein the host bus adapter driver includes means for receiving data write requests from the operating system, means for transmitting the data write requests to the host bus adapter, means for receiving data write request completion commands from the host bus adapter, means for judginq that a failure has occurred when one of the data write requests completion commands has not been received within a predetermined period of time following the transmittal of the data write request from the host bus adapter driver to the host bus adapter, and means for retrieving the collected data when the judgment of a fault has been made to determine whether the fault has occurred in the host system, the host bus adapter, the network or the storage apparatus based on collected data using the time when the predetermined period of time has elapsed as a reference time.

2. The storage system according to claim 1 wherein the host system further comprises:
    a retrieval unit for retrieving relevant collected data from the first storage unit when a failure occurs in the host system, host bus adapter apparatus, network, or storage apparatus; and
    a second storage unit for storing the data retrieved by the retrieval unit.

3. The storage system according to claim 1 wherein the first storage unit in the memory of the host system stores the collected data in chronological order.

4. The storage system according to claim 3 wherein:
    the first and second collection units in the host bus adapter apparatus collect data with the time of collection; and the first storage unit in the memory of the host system stores the collected data and a time of collection while establishing an association therebetween.

5. The storage system according to claim 2 wherein the retrieval unit in the host system retrieves collected data that have been collected a predetermined period of time before and after the occurrence of failure.

6. The storage system according to claim 2 wherein the second storage unit in the host system stores the retrieved data in chronological order.

7. The storage system according to claim 1 wherein the storage apparatus comprises a plurality of disk drives for storing data and reads and writes data from and to one or more disk drives in accordance with a command transmitted from the host system via the host bus adapter apparatus and the network.

8. The storage system according to claim 7 wherein, the storage apparatus further comprises:
 a channel adapter for controlling transmission and reception of data and commands between the storage apparatus and the host system;
 a shared memory for retaining the commands;
 a cache memory for temporarily retaining the data read and written from and to the disk drives; and
 a disk adapter for controlling reading and writing of the data to the disk drives.

9. A host bus adapter apparatus included in a host system for transferring data transmitted from the host system to a storage apparatus via a network which separates the storage apparatus from the host bus adapter of the host system, and transferring data transmitted from the storage apparatus to the host system via the network and wherein the processor includes an operating system and a host bus adapter driver which controls the host bus adapter in accordance with commands from the operating system and the host bus adapter; the host bus adapter comprising:
 a transfer unit for transferring data between the internal bus of the host system and the storage apparatus;
 a first collection unit for collecting data that passes between the internal bus of the host system and the transfer unit;
 a second collection unit for collecting data that passes between the transfer unit and the storage apparatus via the network;
 a transmission unit for transmitting the data collected by the first and second collection units to an external storage unit, and
 wherein the host bus adapter driver includes means for receiving data write requests from the operating system, means for transmitting the data write requests to the host bus adapter, means for receiving data write request completion commands from the host bus adapter, means for judging that a failure has occurred when one of the data write requests completion commands has not been received within a predetermined period of time following the transmittal of the data write request from the host bus adapter driver to the host bus adapter, and means for retrieving the collected data when the judgment of a fault has been made to determine whether the fault has occurred in the host system, the host bus adapter, the network or the storage apparatus based on collected data using the time when the predetermined period of time has elapsed as a reference time.

* * * * *